(12) United States Patent
Tsaur et al.

(10) Patent No.: US 8,510,271 B1
(45) Date of Patent: Aug. 13, 2013

(54) APPLICATION AND FILE SYSTEM DATA VIRTUALIZATION FROM IMAGE BACKUP

(75) Inventors: Ynn-Pyng A. Tsaur, Oviedo, FL (US); Lokesha Krishnamurthy, Sanford, FL (US); Baishen Zhu, Sanford, FL (US)

(73) Assignee: Symantec Corporation, Mountain View, CA (US)

( * ) Notice: Subject to any disclaimer, the term of this patent is extended or adjusted under 35 U.S.C. 154(b) by 277 days.

(21) Appl. No.: 12/414,009

(22) Filed: Mar. 30, 2009

(51) Int. Cl.
*G06F 12/00* (2006.01)
*G06F 7/00* (2006.01)

(52) U.S. Cl.
USPC ............ 707/674; 707/640; 707/649; 707/686

(58) Field of Classification Search
USPC .................................. 707/600–787, 790–831
See application file for complete search history.

(56) References Cited

U.S. PATENT DOCUMENTS

| | | | | |
|---|---|---|---|---|
| 5,687,343 | A * | 11/1997 | Fecteau et al. ................. | 711/202 |
| 6,542,909 | B1 * | 4/2003 | Tamer et al. ................... | 707/756 |
| 6,983,295 | B1 * | 1/2006 | Hart .............................. | 707/610 |
| 2003/0028736 | A1 * | 2/2003 | Berkowitz et al. ............ | 711/162 |
| 2004/0010487 | A1 * | 1/2004 | Prahlad et al. ................ | 707/1 |
| 2006/0053178 | A1 * | 3/2006 | van Ingen et al. ............ | 707/204 |
| 2007/0033375 | A1 * | 2/2007 | Sinclair et al. ................ | 711/203 |
| 2009/0310447 | A1 * | 12/2009 | Ikawa ........................... | 369/44.15 |
| 2010/0076932 | A1 * | 3/2010 | Lad .............................. | 707/639 |

OTHER PUBLICATIONS

"Customer FAQ—Symantec Backup Exec(TM) 12.5 for Windows(R) Servers and Symantec Backup Exec(TM) System Recovery 8.5", pp. 1-12, Aug. 2008.
"Comprehensive Backup and Recovery of VMWare Virtual Infrastructure, Symantec Backup Exec(TM) 12.5 for Windows Servers", 25 pages , Sep. 2008.

* cited by examiner

*Primary Examiner* — Srirama Channavajjala
*Assistant Examiner* — Miranda Huang
(74) *Attorney, Agent, or Firm* — Campbell Stephenson LLP

(57) ABSTRACT

A system uses one or more processors and an interface to a backup repository to generate a set of backup objects for a point in time, store the set of backup objects in the backup repository, and store mapping information usable to retrieve appropriate backup objects when desired. A first map relates one or more applications to objects used by the applications. A second map relates the objects to corresponding data blocks or other data locations on volumes. A third map relates the data locations to corresponding backup objects for the point in time.

20 Claims, 6 Drawing Sheets

APPLICATION AND FILE SYSTEM DATA VIRTUALIZATION FROM IMAGE BACKUP

FIELD OF THE INVENTION

The invention relates generally to the backup and recovery of stored data, and more particularly to the backup and recovery of data used by application programs or file systems.

BACKGROUND

Backup and recovery systems are important features in systems that store crucial data for the usual operations of a business endeavor. For businesses that increasingly depend on data and information for their day-to-day operations, the unplanned downtime that occurs when a computer system needs to be restored to an earlier configuration can impact financial goals and reputations. Rapid, simple, and accurate recovery operations are valuable features of a backup and recovery system.

In various situations, a recovery can be performed to restore the data used by an application after a system has failed. In anticipation of such failures, the data used by the application can be stored from time to time on backup storage systems. The backup copies can be made by querying the application to obtain files, data records, email messages, or similar objects that are used by the application, and copying those objects onto a backup storage system for preservation.

Such backups of logical objects, however, impose overhead costs on the application, which must assist in the continually ongoing backup operations. The application must be diverted from regular operations to assist the backup operations, providing the relevant files to the backup operations for storage. Moreover, such backups generally suffer from a lack of consistency: while one particular file is being backed up, a related file may be modified or deleted by the application. The resulting set of backup files can thus be a set of files (or email messages or other logical objects) that do not bear a consistent temporal relationship with each other.

SUMMARY

Described herein are methods and systems that can be used for backup and recovery of data. In one implementation, a method includes generating and storing a set of backup objects for a point in time. The backup objects hold the contents of a plurality of storage volumes as used by a server or other computing system at a point in time. Each storage volume has a plurality of locations, such as fixed-length data blocks, in which data can be stored. The method further includes obtaining a first mapping information associated with a set of one or more applications from the server. For each of the applications, the first mapping information identifies objects used by the application at the point in time. The method also includes obtaining a second mapping information for a plurality of objects identified in the first mapping information, and for each of these objects identifying data locations in which the object was stored at the point in time. The method also generates a third mapping information. For each identified data location, the third mapping information identifies backup objects in which contents of the data location were stored for the point in time.

The method also includes transforming a backup repository by storing the first, second, and third mapping information into the backup repository. In various implementations of the method, the first mapping information comprises file paths of objects used by the first application, and the second mapping information identifies a first set of data locations for files identified by the file paths. The first set of data locations correspond to a first set of blocks that stored the first file at the point in time. In various implementations, the third mapping information identifies a first set of block-level images that hold copies of the first set of blocks from the point in time.

In one implementation, a system includes one or more processors and an interface to a backup repository. The one or more processors are configured to generate a set of backup objects and to store the set of backup objects in the backup repository. The backup objects preserve storage volumes from a point in time. The one or more processors are configured to obtain a first mapping information associated with a set of one or more applications, a second mapping information for a plurality of objects identified by the first mapping information, and a third mapping information for a plurality of data locations identified by the second mapping information. The first mapping information identifies objects used by each application at the point in time. The second mapping information identifies data locations in which each object was stored on the storage volumes at the point in time. The third mapping information identifies backup objects in which contents of the data location were stored for the point in time.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Figure 1:
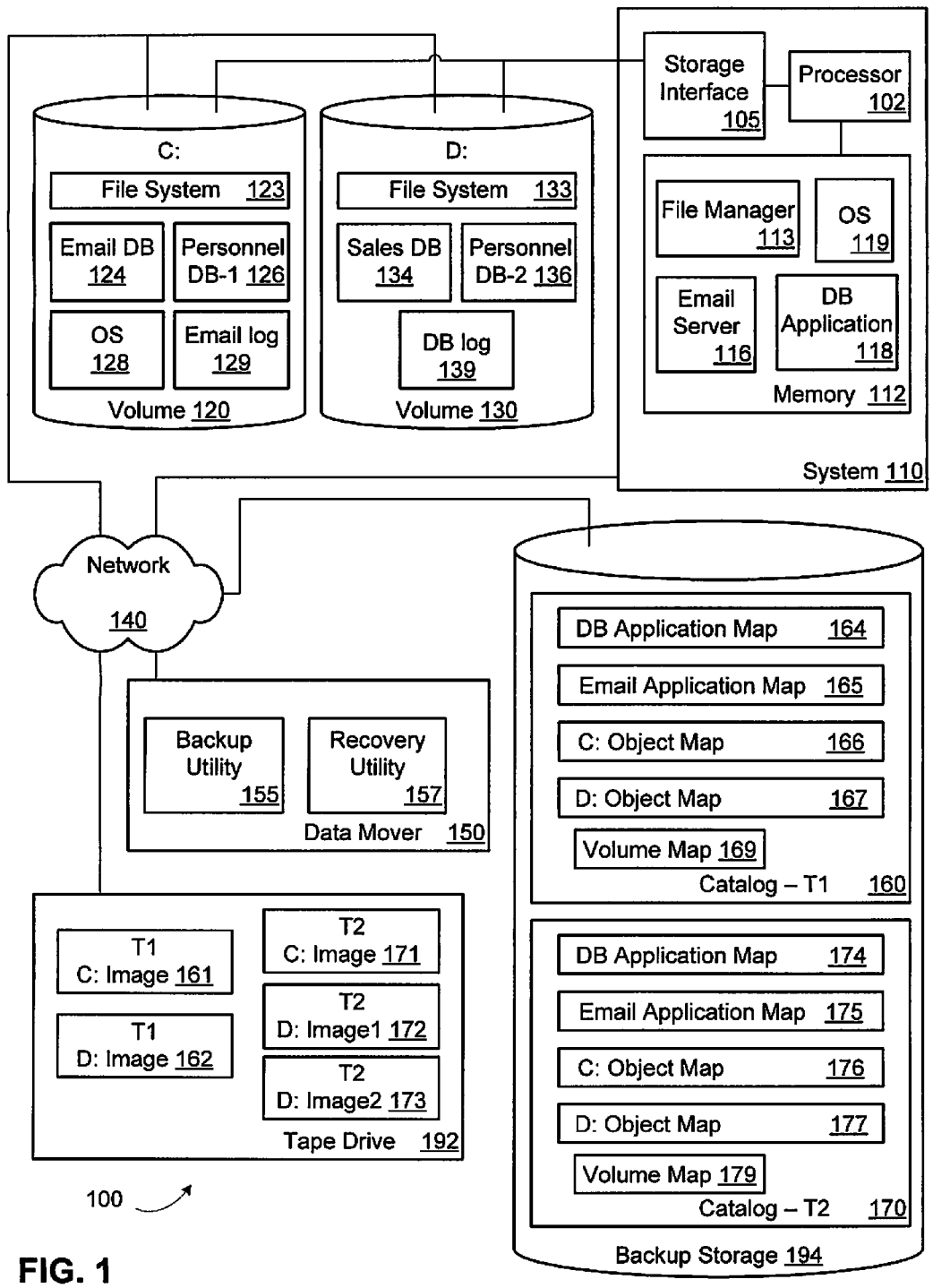
FIG. 1 shows an example computing environment that includes components for backing up and restoring data associated with particular applications running on a computing system.

Described herein are tools and techniques that can be used, for example, for backing up and restoring data. In various implementations these tools and techniques can provide a consistent backup of the files and other logical objects that are used by various applications at a point in time. In addition, various implementations of these tools and techniques can be used to backup and restore of logical objects without imposing a substantial additional overhead on the systems and applications that use those objects. Such facilities may be useful in some circumstances to simplify the processes of protecting against the failure of a system on which an application is running, and of protecting against the corruption of data used by an application. Such facilities may also assist in data recovery efforts.

In various implementations, a system that generates and stores an application map, an object map, and a volume map may provide some of these benefits. The application map can describe locations of logical objects used by one or more applications. For each of the logical objects, the application map holds an object address that describes where the object can be found within a collection of storage volumes. For example, the application map can include file names and file paths of files that are used by an application; the record address within databases of records that are used by an application; the index information of mailboxes, user settings, email messages, and email attachments that are used by an application; and other object identifiers and addresses of objects that are used by an application.

The object map can describe the data locations of objects that are stored on the storage volumes. The data locations describe locations of data within the storage volumes. The data locations can be, for example, block addresses of the objects. Alternatively, other data locations can be used. For example, the data locations may indicate locations or offsets into a container file that provides a file-to-block mapping or otherwise relates the data locations to the block addresses. Thus, one or more levels of indirection can connect the data locations to the block addresses. The block addresses (or other types of data locations) are used by backup tools that can generate rapid or low-overhead copies of the storage volumes.

The volume map can describe the locations of various backed-up portions of storage volumes among various stored backup objects. The backup objects can be, for example, files that each hold volume images, or portions of volume images, from one or more points in time. The volume map can describe which backup objects would be needed to recover a particular set of data locations from a particular volume at a particular point in time.

These maps can be useful for recovering entire systems, or individual volumes, or individual applications to a previous state from the backup objects. The backup objects can be made using volume snapshots and volume image copies, which allow for lower overhead and quicker backup of data than file-by-file backups. The snapshots and images can also be made in a consistent manner, as opposed to backups that interrogate an application over a period of time in which data is modified by the application's ongoing operations.

FIG. 1 shows an example computing environment 100 that includes components for backing up and restoring data associated with various applications running on a system 110. Environment 100 includes system 110, a data mover 150, a tape drive 192, and a backup storage 194. A network 140 provides communication among these elements 110, 150, 192, and 194.

System 110 includes a memory 112 and a processor 102 configured to run various software programs that are resident in memory 112. In the illustrated example, the programs include a file manager 113, a database ("DB") application 118, and an email server 116. These programs rely on data that are stored on two storage volumes 120 and 130, which are connected to system 110. A storage interface 105 in system 110 allows communication between programs 113, 116, 118 and storage volumes 120, 130. Storage volumes 120 and 130 are depicted as two external volumes in this example. Alternatively, or in addition, storage volumes 120 or 130 can be internal volumes in system 110, or can be accessed by system 110 through network 140 or through other networks or communications links. The storage volumes can be one or more volumes such as disk partitions, virtual volumes stored in volatile memory, volumes on a virtual machine, or other types of storage volumes that store information in units such as blocks that are described by locations such as block addresses, or combinations thereof.

Data mover 150 is a computing device that can work in concert with a backup server, or that can be incorporated in a backup server. A backup utility 155 running on data mover 150 manages backup copying of volumes 120 and 130. A recovery utility 157 can be executed on data mover 150 to oversee the recovery of volume 120 or 130 or of programs 113, 116, or 118.

As illustrated, data mover 150 is coupled to volumes 120 and 130 through network 140. Network 140 is a local area network that connects components of environment 100. Alternatively, network 140 can be a storage area network (SAN), or a wide area network (such as the internet) that enables remote-location redundant disaster recovery, or other communications media for linking storage units and processors in the computing environment.

The storage volumes are used by the programs to store data used by the programs. Email server 116 stores email messages, email attachments, email user account information, and other email data in one or more files that comprise an email database 124 on volume 120. Email server 116 is supported by an operating system 119 that runs on system 110, and which is loaded from operating system software 128 stored on volume 120. Email server also uses a record of past activity in the form of an email log file 129 stored on volume 120.

Database application 118 also stores data on volume 120, such as a first personnel database ("DB-1") 126. Database application 118 runs on system 110 with support from operating system 119. Database application 118 also stores data on volume 130, such as a second personnel database ("DB-2") 136 and a sales database 134. Database application 118 also uses auxiliary software such as database log file ("DB log") 139 stored on volume 130.

File manager 113 formats, stores, and retrieves information as files on volumes 120 and 130 when requested by operating system 119 or programs 116 or 118. Other logical formats instead of files can also be used. File manager 113 uses records of where data is stored on the volumes. These records are stored on the respective volumes: a file system 123 stored on volume 120 describes locations, sizes, file paths, checksums, and/or other metadata for the files that are stored on volume 120. File system 123 includes starting block information or other data location information for the files that are stored on volume 120. Similarly, a file system 133 stored on volume 130 describes locations, sizes, file paths, checksums, and/or other metadata for the files that are stored on volume 130. File system 133 includes starting block information or other data location information for the files that are stored on volume 130. File manager 113 and file systems 132 and 133 can also include overall information and metadata for the volumes 120 and 130. As illustrated, file manager 113 identifies volume 120 to system 110 as volume "C:". File manager 113 identifies volume 130 to system 110 as volume "D:".

Backup utility 155 performs block-level backups of volumes 120 and 130 according to a backup schedule. The backups create block-by-block copies of volumes 120 and 130; these copies are stored on tape drive 192 as files that hold images of the volumes. In various implementations, the backups are performed using snapshots of volumes 120 and 130 to obtain point-in-time copies of the volumes. The snapshots can be copy-on-write snapshots or other types of snapshots. Instead of storing the copied data on a tape drive, other storage devices can be used as a repository to store backup information, such as a disk drive, a tape library, a group of disk drives (e.g., "just a bunch of disks" or "JBOD"), a storage array, an optical backup disk, an appropriate semiconductor memory, or other devices suitable for backup storage or archival storage, or a combination thereof.

FIG. 1 illustrates an image 161 on tape drive 192; this image 161 holds a block-level copy of volume 120 as it existed at a previous point in time T1. Tape drive 192 also stores an image 162, which holds a block-level copy of volume 130 as it existed at time T1. The contents of images 161 and 162 are described in a catalog 160, which can be separately stored on backup storage 194. Catalog 160 can assist in recovering data for time T1 from images 161 and 162.

FIG. 1 also shows images 171, 172, and 173, which hold block-level copies of data from another previous point in time T2. Images 171, 172, and 173 are described in a catalog 170. Catalog 170 can assist in recovering data for time T2 from images 171, 172, and 173. Image 171 holds a block-level copy of volume 120 from time T2. Images 172 and 173, in combination, hold a block-level copy of volume 130 from time T2.

In general, block-level backups have advantages over various other forms of backups, such as file-by-file backups or agent-based backups. File-by-file backups interact with a file manager to gather individual files and generate backup copies of each file. An agent-based backup communicates with an application to collect data used by that application. Agent-based backups can obtain data such as individual email messages, collections of email messages such as user mailboxes, email attachments, individual text messages, collections of text messages, individual data records from databases, or collections of data records such as rows or columns from a spreadsheet. File-by file-backups and agent-based backups can provide a useful feature of granularity: the data can be backed up in discrete, compact, self-contained collections of objects e.g., a compressed collection of files, a collection of related emails, or an excerpt from a database. Users may more readily browse through such granular backup objects, since each of these backup object contain at least partially-related information.

However, the advantage of granularity comes at a cost when it is achieved through file-by-file backups or agent-based backups. File-by-file backups impose an overhead on the system, since they require a file manager (e.g. 113) to read information from file systems (e.g., 132 and 133) to determine where the files are to be found among the data blocks in the volumes. This overhead can take the form of processing costs and data-access costs, which can impair the operation of the main applications on the system. Similarly, agent-based backups also impose an overhead on the system, since they require interaction with the main applications (e.g. 116 and 118) to obtain the objects being backed up. This overhead can take the form of data-access costs and substantial processing costs, which can also impair the operation of the main applications.

Block-level backups—by themselves—do not provide the granularity that is available from file-by file-backups and agent-based backups. However, block-level backups can impose comparatively less overhead on a system. Starting from a snapshot, for example, a block-level backup can be run on an auxiliary system, such as data mover 150, and can interact directly with the volumes being backed up, such as volumes 120 and 130. This direct interaction substantially reduces the overhead that the backup operations place on a system, such as system 110. Moreover, block-level backups are relatively fast as compared with file-by file-backups and agent-based backups, since they can use substantially simplified access to the media within the storage volumes. For example, a block-level backup may use a simple block-by-block copy of an entire volume, supplemented by updates of the blocks that then change as time passes. A block-level backup may thus be performed with little or no reliance on a file manager or file system, or on applications that use the data being backed up. For these and other reasons, block-level backups can be comparatively fast and low-overhead. The techniques described below can, in some implementations, add a benefit of increased granularity to block-level backups.

In the illustrated example, one image is sufficient to recover each of volume 120 to time T1 (image 161), volume 130 to time T1 (image 162), and volume 120 to time T2 (image 171). However, two images (images 172 and 173) are needed to recover volume 130 as it existed at time T2. The situation can be further complicated as time progresses, when one or more images are made for one or more volumes at subsequent points in time (T3, T4, . . . ). Moreover, in various implementations, a system may use more than two volumes. The number of images that are eventually stored on the backup storage can be large. This large number of images can be needed to accommodate the multiple points in time, the multiple volumes that are backed up, and the correspondence between volumes and images at each point in time (one-to-one, one-to many, many-to-one, or many-to-many). Thus, it will be recognized that although the example of FIG. 1 illustrates only five backup objects that store copies of backed-up information (image files 161, 162, 171, 172, and 173), in practice, a backup system may need to maintain and track hundreds or thousands of such backup objects.

To keep track of which images or other backup objects would be needed to restore each volume for each point in time, backup utility 155 generates volume maps 169 and 179 and stores these volume maps on backup storage 194. Volume map 169 indicates a correspondence between the data locations on the volumes that are backed up at time T1 and the images that contain the data from those data locations.

Information in volume map 169 indicates that image 161 holds a backup of the data locations from volume 120 at time T1, and that image 162 holds a backup of the data locations from volume 130 at time T1. Volume map 169 is thus a mapping of data locations to the backup images that were made of those volumes at time T1. Volume map 169 is included in catalog 160.

Similarly, volume map 179 is a mapping of data locations to the backup images that were made of those volumes at time T2. Information in volume map 179 indicates that image 171 holds a backup of the data locations from volume 120 at time T2. Volume map 179 also indicates that image 172 holds the data from one range of block addresses (or other sets of data locations) from volume 130 at time T2, and that image 173 holds the data from another range of block addresses (or other data locations) from volume 130 at time T2. Volume map 179 is included in catalog 170.

Backup utility 155 also gathers and stores information that lists the files and other logical objects that are used by programs 116 and 118 at each point in time T1 and T2. This information is stored in database application maps 164 and 174, and in email application maps 165 and 175. The application maps also record the locations within the original volumes of the listed files (e.g. file paths) and other logical objects (e.g., database record identifiers, registry addresses, email message identifiers, among others).

The information in application maps 164, 165, 174, and 175 is organized according to the applications that use the listed objects and according to the points in time for the listings. In the illustrated example, database application map 164 lists the logical objects (and their locations) that are used by database application 118 at time T1. Email application map 165 lists the logical objects (and their locations) that are used by email server 116 at time T1. These application maps 164 and 165 are included in catalog 160, which can be used to recover data as it existed at time T1. Similarly, application maps 174 and 175 are included in catalog 170, which can be used to recover data as it existed at time T2.

For example, database application map 164 holds information regarding the files and other logical objects that are used by database application 118 to store information at time T1. These objects include first personnel database 126 and sales database 134. In various implementations, database application map 164 also holds information regarding the logical objects that would be useful to restore database application 118 to the configuration that exists at time T1. These objects include, for example, database log file 139. The result is a list of logical objects—objects 126, 134, and 139—that are relevant to database application 118 at time T1. This list can be gathered, for example, by interrogating database application 118 at time T1 (e.g., using an interrupt mechanism in a snapshot generating application, or using an appropriate application program interface (API)), or by reviewing system registry information on system 110, or by reading an automatically generated (or manually generated) data file that indicates the relevant logical objects, or by other means.

Similarly, database application map 174 list the objects (and their locations) that are used by database application 118 at time T2. As an example, this listing includes the logical objects that were relevant at time T1—objects 126, 134, and 139—and also includes second personnel database 136, which was created between T1 and T2. Email application maps 165 and 175 similarly list the objects (and their locations) that are used by email server 116 at times T1 and T2 (respectively).

Some of the information in the application maps can be obtained at the time that a snapshot is made of the volumes used by the applications. For example, backup utility 155 can use an interrupt mechanism in a snapshot generating application that briefly brings a volume to a quiescent state while initial snapshot information is gathered. Quiescing a volume can include identifying open files or other logical objects that are in use by particular applications. Backup utility can interrogate system 110 during the brief quiescence period to determine which logical objects on the volume are subject to the quiesced access, and which corresponding applications rely on these logical objects. This information can be used to generate the application mapping information.

Catalog 160 also includes object maps 166 and 167, which bridge the information between the application maps 164, 165 and the volume map 169. Object map 166 lists the names of logical objects stored on volume 120 (C:) at time T1 and their respective logical addresses, such as file paths or registry information. Object map 166 also includes the corresponding data locations of each logical object, such as offsets into a container file, or starting block addresses, or complete listing of block addresses, or block offsets, or relevant sector addresses. If object map 166 uses block addresses, then the block addresses can be recorded in a logical block address (LBA) scheme, or a cylinder-head-sector (CHS) scheme, or Extended Cylinder-Head-Sector (ECHS) or others.

Object map 167 similarly lists the logical objects stored on volume 130 (D:) at time T1, along with their respective logical addresses and the corresponding data locations. In addition, FIG. 1 shows object maps 176 and 177 in catalog 170. Object maps 176 and 177 correspond to time T2, and bridge the information between the application maps 174, 175 and the volume map 179. Object map 176 lists the logical objects stored on volume 120 (C:) at time T2, along with their respective logical addresses and the corresponding data locations. Object map 177 lists the logical objects stored on volume 130 (D:) at time T2, along with their respective logical addresses and the corresponding data locations.

The information in an object map can be gathered after the time that a snapshot is made. Gathering this information can require an analysis of the volume, such as the data location information that can be stored in file system 123 or 133, for example. This information can be obtained from the snapshots of volumes 120 and 130. In other implementations, this information can be obtained from block-level copies of volumes 120 and 130 that are temporarily mounted on data mover 150 from the volume snapshots. Using mounted copies of the snapshot volumes can, in some implementations, avoid adding overhead to system 110.

Figure 2:
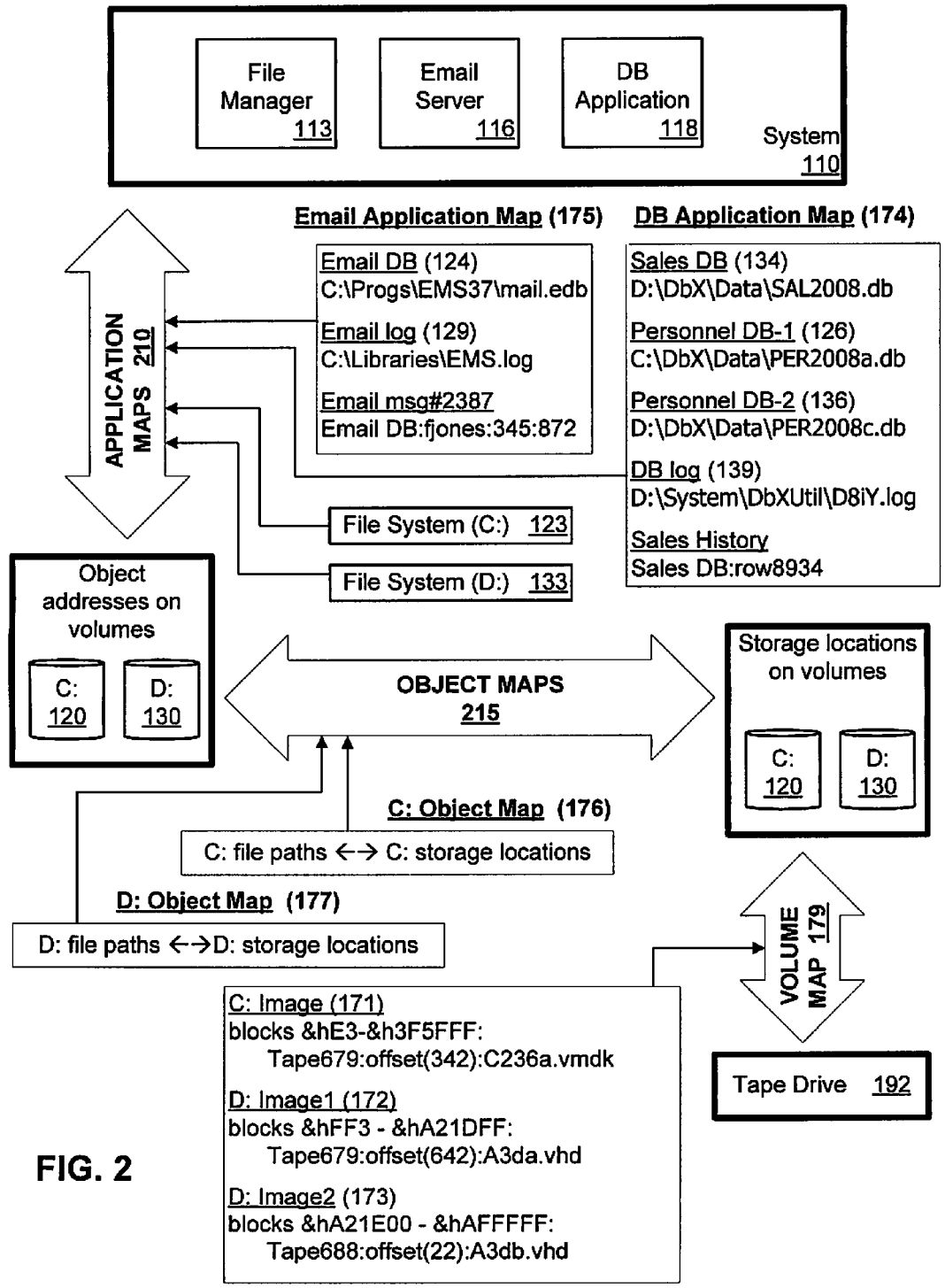
FIG. 2 shows an example of an application map, an object map, and a volume map for the system from FIG. 1.

FIG. 2 shows an example of application maps 210, object maps 215, and volume map 179 for point in time T2, using elements and data that from FIG. 1. Application maps 210 include information from database application map 174 and email application map 175. As illustrated, application maps 210 can also include file directory information from file systems 123 and 133. As indicated by the double-arrow icon, application maps 210 describe relationships between programs 113, 116, and 118 and objects stored on volumes 120 and 130 at time T2. Application maps 210 also indicate logical locations of the objects within volumes 120 and 130 at time T2.

Object maps 215 include information from object maps 176 and 177. Object maps 176 and 177 also correspond to time T2, and can be used to cross-reference the logical addresses from application maps 210. Object map 176 lists the logical objects stored on volume 120 (C:) at time T2, along with their respective logical addresses. As discussed above, object map 176 also indicates the corresponding data locations that hold the data for objects at the various logical addresses. Object map 176 thus relates logical addresses to data locations for the logical objects that are on volume 120 at time T2. Object map 177 similarly relates logical addresses to data locations for the logical objects that are on volume 130 at time T2.

Volume map 179 can be used to cross-reference the data locations in object maps 215 with the backup objects that hold data from those data locations. Volume map 179 describes relationships at time T2 between the volumes (120, 130) and the backup objects (171, 172, 173) that hold copies of the data from the volumes. Volume map 179 also indicates locations of the backup objects in tape drive 192. The locations can include serial numbers for individual tapes and offset addresses on the tapes.

Maps 210, 215, and 192 can be used at a time after T2, when a user or system administrator wishes to restore one or more of the programs running on system 110 to the state it was in at time T2. Alternatively, the maps can be used to restore the entire system 110 to the state it was in at time T2. Such restorations, or recoveries, may be desired in order to roll back a system or application to a situation that preceded a hardware failure, a software failure, a user error, or some other undesired event. Hardware failures include, for example, failures of storage devices, processor failures, and other component failures that can corrupt data or render data unreliable. Software failures include, for example, virus infections or mis-configuration of a software update. User errors include an inadvertent deletion of files or the corruption of a part of a database because of an incorrect update of records, among others. Restorations of an application or system can also be helpful in the absence of error events, for example, to recover archived data from a library of historical volume images.

To assist in the recovery of a particular application, application maps 210 provide a listing of the relevant files and other logical objects that would be needed for the recovery. For example, consider a situation in which a system administrator wishes to recover objects used by database application 118 at prior time T2. The system administrator can use the information shown in FIG. 2 to perform this recovery.

Application maps 210 indicates the logical objects that would be needed to reproduce file system 123 (for volume C:) and file system 133 (for volume D:), respectively, as used by file manager 113 at time T2. This information can also include a file/path listing of the volumes from time T2.

Application maps 210 also include database application map 174 and email application map 175. Email application map 175 indicates the logical objects that would be needed to recover the relevant data that was used by email server 116 at time T2. As shown in the example of FIG. 2, email application map 175 refers to email database 124 and has an addresses for a file ("C:\Progs\EMS37\mail.edb") that held the contents of email database 124 at time T2. Email application map 175 also refers to a log file ("C:\Libraries\EMS.log") that was used by email server 116 at time T2. In addition, email application map 174 can also refer to particular email mailboxes, email messages (e.g., "Email DB:fjones:345:872"), attachments, excerpts, sets of data within these files.

Database application map 174 indicates the logical objects that would be needed to recover the data used by database application 118 at time T2. As shown in the example of FIG. 2, database application map 174 refers to sales database 134, personnel database 126, and personnel database 136, and has addresses for files ("D:\DbX\Data\SAL2008.db", "C:\DbX\Data\PER2008a.db", and "D:\DbX\Data\PER2008c.db") that held the contents of these databases 134, 126, and 136 at time T2. Database application map 174 also refers to a log file ("D:\System\DbXUtil\D8iY.log") that was used by database application 118 at time T2. In addition, database application map 174 can also refer to particular excerpts, or portions, or sets of data (e.g., "sales DB:row8934") within these files.

The information from application map 174 indicates which logical objects would be needed to recover the full database application 118 to time T2. As shown in the example of FIG. 2, database application map 174 indicates that the desired recovery of database application 118 will require logical objects that were stored on the C: volume 120 (C:\DbX\Data\PER2008a.db and C:\DbX\Data\PER2008c.db), and will also require objects that were stored on the D: volume 130 (D:\DbX\Data\SAL2008.db and D:\System\DbXUtil\D8iY.log). The recovery operation can then proceed by taking appropriate steps to recover objects from backups of these two volumes 120 and 130 from time T2.

In various implementations of the recovery operations, these desired volumes are copied from the appropriate backup objects (such as images 171, 172, and 173) onto the system 110, which can then resume operations using the recovered data from time T2. Alternatively, the desired volumes are mounted onto a backup system (which can be a physical system or a virtual machine). These remounted volumes can then serve as sources for the desired backup versions of various files and other logical objects. For example, the remounting can be done on data mover 150 from FIG. 1. The remounting can be done on physical operating computer systems, or can be done on virtual machines that are simulated within one or more physical machines. The remounted volumes can be stored on various forms of non-volatile media such as optical, magnetic, or pervasive semiconductor memory (e.g., flash memory), or in volatile media such as semiconductor random access memory (RAM). The choice of media for remounting the volumes can involve consideration such as tradeoffs between cost and speed (e.g. high-speed RAM vs. low-cost magnetic disk drives).

The information in object maps 215 and volume map 179 can facilitate the remounting of the desired volumes for the recovery of database application 118. Object maps 215 identify the data locations that would be needed to remount the needed volumes (120 and 130) with their contents from time T2. Volume map 179 identifies the backup objects that hold these data locations from time T2. In the example shown in FIG. 2, volume map 179 indicates that three backup objects were used to store the contents of volumes 120 and 130 at time T2: images 171, 172, and 173. Image 171 holds a block-level copy of volume 120 from time T2. Image 172 holds portions of a block-level copy of volume 130 from time T2, and image 173 holds the remaining portions of the block-level copy of volume 130 from time T2.

In various implementations, application maps 210 also include a memory image (not illustrated) that records the contents of volatile memory used by system 110 at time T2. For example, the memory image can be a hibernate file such as a file used to record contents of random access memory (RAM) in sleeping mode S4 according to the Advanced Configuration and Power Interface (ACPI) specification. The memory image can be stored in catalog 170, and can be used to recover system 110 to the on-the-run operating state that existed at time T2. Such an operating-state restoration can provide a higher-fidelity restoration than a restoration that only recovers the non-volatile contents of relevant storage volumes. Various considerations and additional information can be relevant in the implementation and use of the memory image. For example, the memory image may be less useful if system 110 or applications 116 or 118 were interacting heavily with other systems at time T2. In such situations, the state of volatile memory may be unusable, since the other systems will no longer be in the prior state from time T2. While an the on-the-run operating state recovery may not be useful in such situations, a restoration of the files used by system 110 at time T2 may nonetheless be of significant value to users and administrators.

Recovery utility 157 (from FIG. 1) can be used to restore appropriate copies of volumes 120 and/or 130 from the images 161, 162, 171, 172, 173 or other backup objects, or to obtain desired copies of one or more particular logical objects from the backup objects. In the situation where a system administrator wishes to recover the data used by database application 118 to the state at prior time T2, recovery utility 157 learns from application maps 210 that volumes 120 and 130 are both needed in order to obtain the desired files and other logical objects. Recovery utility 157 then learns from object maps 215 and volume map 179 that the backup objects needed to remount these two volumes can be found in backup objects images 171, 172, and 173. If the recovered volumes are copied onto system 110 as replacements of the current versions of volumes 120 and 130, then database application 118 can resume operations using the relevant data that were available at time T2.

Alternatively, the recovered volumes can be remounted onto an auxiliary system such as data mover 150, or can be remounted onto system 110 without replacing the current versions of volumes 120 and 130. In these implementations, the remounted volumes can serve as sources of granular recovery information. Recovery utility 157 can search through these copies of the volumes to select individual files, email messages, database entries, text messages, email attachments, or other objects for recovery.

Recovery utility 157 can similarly be used in a situation where the system administrator wishes to revert email server 116 on system 110 to the state at prior time T2. This example situation illustrates some efficiency that can be provided by application maps 210.

In this situation, recovery utility 157 learns from application maps 210 that only volume 120 is needed to recover the data from time T2 for application 116. Volume 130 does not have any of the data needed for this restoration of email server 116. This is evident from email application map 175 as shown in FIG. 2. Email application map 175 lists two logical objects for the recovery of email server 116: email database 124 and email log file 129. (The third logical object in the illustrated example is contained within email database 124, and does not require separate attention for a restoration of the full email application). According to email application map 175, both of these logical objects were stored on the C: drive (volume 120), as shown by their locations (file paths c:\Progs\EMS37\mail.edb and C:\Libraries\EMS.log). Recovery utility 157 therefore proceeds by remounting only the one volume (120) that needs to be remounted. This recovery is somewhat simpler than the above example, in which both volumes (120 and 130) were needed for the recovery of database application 118.

Application maps 210 thus inform the recovery operation that only one of the two T2 volumes needs to be remounted in the situation where email server 116 is being recovered. Because of the information that was recorded in application maps 210, recovery utility 157 can avoid a wasteful remounting of volume 130, which is not needed to recover email server 116 to time T2. Similar efficiencies can be gained from using object maps 215 and volume map 192.

The value of this simplification scales with the complexity of the backup operations. It can be particularly valuable in more complicated scenarios, where a large number M of volumes (e.g., M=35) for a system have been backed up for a point in time into a large number of backup objects (e.g., N=208), but only a small subset of N of those volumes (e.g., m=3) needs to be remounted from a small number of backup objects (e.g., n=7) in order to recover the necessary logical objects for a particular application. Without appropriate records regarding the application at the previous point in time, all 208 backup objects would be retrieved so that all 35 volumes from the point in time can be remounted to guarantee that the application can obtain the relevant data. However, with appropriate records—such as maps 210, 215, and 192—only 7 backup objects need to be retrieved to remount the 3 necessary volumes.

The impact of this simplification scales with the complexity of the volume imaging operations. Especially in situations where numerous backup objects are used for each point-in-time backup of one or more volumes (e.g., in various virtual machine environments), recovery utility 157 can benefit from the information in application maps, object maps, and volume maps (such as 210, 215, and 192). By focusing on the required volumes and required backup objects, recovery utility 157 can winnow the numerous backup objects listed in the catalog down to a reduced set of backup objects that are actually needed for recovering a particular application.

Recovery utility 157 can similarly be used in a situation where the system administrator wishes to restore file manager 113 to prior time T2. From application maps 210, recovery utility 157 determines that files systems 123 and 133 are both needed for this recovery. Accordingly, recovery utility 157 recognizes that both volume 120 (C:) and volume 130 (D:) will need to be remounted. From object maps 215 and volume map 179, recovery utility 157 determines that the necessary data for remounting these two volumes can be found in images 171, 172, and 173.

Figure 3:
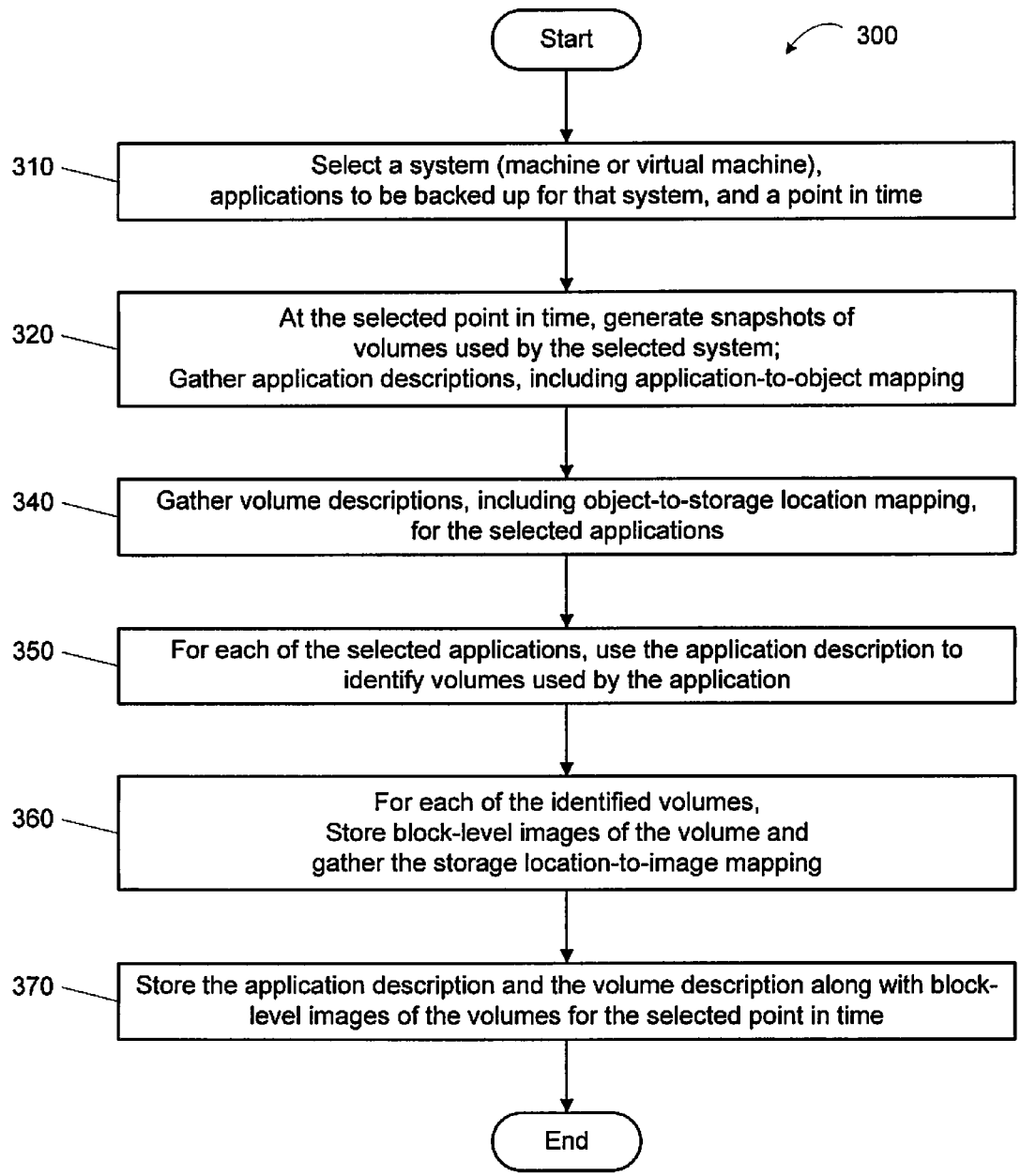
FIG. 3 is a flow chart of an example of a method to perform a backup of a system at a point in time.

FIG. 3 is a flow chart of an example of a method 300 to perform a backup of a system at a point in time. In act 310, the method selects a system, such as a computer or other processing machine (or virtual machine) to be backed up. This act also includes identifying any particular applications that should be available for restoration on an application-by-application basis, without a full restoration of the entire system. Act 310 also selects a point in time for the backup. The selections in act 310 can be made automatically, based on a predetermined fixed or variable backup schedule, or based on recent activity statistics that indicate high activity for certain systems or applications, or based on configuration files that assign priorities for various systems or applications running on certain systems, or based on manual inputs by an administrator, or other factors, or based on combinations thereof. As an example, act 310 and other acts in method 300 may be performed by backup utility 155 from FIG. 1, to store backup information that is used by system 110.

When the selected point in time arrives, act 320 initiates the recording of consistent backup copies of the stored data that are used by the machine at the point in time. In one implementation, these consistent backup copies are made by initially making snapshots of the volumes used by the system at the selected point in time. For example, the snapshots can be copy-on-write snapshots of the volumes, or redirect-on-write snapshots, or a log structure, or other types of snapshots, or combinations thereof. Alternatively, or in addition, a consistent copy of a volume can be made by splitting a pre-existing mirror, or by using a continuous data protection (CDP) server, or other techniques.

Act 320 also gathers descriptions of the applications that have been selected for application-by-application recovery. Each application description includes a list of files and other logical objects that the application uses and/or relies on at the selected point in time. In various implementations, the application descriptions can also include identifying information for the application (e.g., name, application identifier, version information, update history, libraries used, or locations for reinstallation software, among others). These descriptions include application-to-object mapping information, which identifies the locations within the original volumes of relevant files or other logical objects for each selected application. For example, database application map 174 from FIG. 2 lists the database files and log files used by application 118, and also indicates the file paths for each of those logical objects on the C: and D: volumes for system 110. The application descriptions can be obtained by interrogating the selected applications at time T1 (e.g., using an interrupt mechanism in a snapshot generating application, or using an appropriate application program interface (API)), or by reviewing system registry information on system 110, or by reading an automatically generated (or manually generated) data file that indicates the relevant logical objects, or by other means.

Act 340 gathers descriptions of objects from the snapshots (or other consistent backup copies) from act 320. These descriptions include object-to-data location mapping information, which identifies the relevant data locations for each logical object that is referenced by the application-to-object mapping information. In various implementations, the object-to-data location mapping information is obtained separately for each of the volumes, and identifies the data locations used by each of the logical objects on the volume. The object-to-data location mapping information can be used, for example, to generate object maps 215.

Act 350 identifies the volumes that need to be backed up. If the selections from act 310 specify that all volumes used by a system (e.g., system 110) are to be backed up, then act 350 queues each of the volumes used by the selected system to be stored as image backups. If, however, the selections from act 310 specify that backup is needed only for selected applications, then act 350 reviews the application descriptions from act 340 to learn where the required logical objects are stored. Based on the locations of the required logical objects, act 350 identifies the volumes that hold those logical objects, and queues only those volumes for backup. (Alternatively, the application-specific backup can trigger a system-wide backup of each volume used by the system.) The snapshots from act 320 can be used to generate image backups of the volumes for the selected point in time.

Act 360 stores consistent copies, such as block-level images, of each of the volumes identified in act 350. The copies are packaged in backup objects, such as image files that hold one or more entire volumes or portions of volumes. As the copies of the volumes are generated and stored, act 360 records a volume map of the backup objects. The volume map indicates which of the backup objects are used to store which portions of each volume. In the reverse direction, the volume map can also indicate which volume(s) or portions of volumes are stored in each backup object. The volume map thus serves as a data location-to-image mapping between the relevant volumes from the selected system and the backup objects that hold images of the volumes.

In act 370, the application-to-object mapping from act 320, the object-to-data location mapping from act 340, the data location-to-image mapping information from act 360, and the backup objects from act 360 (which hold the block-level image data), are stored in backup storage. These data are stored in association with each other (e.g., in a single file or group of files, or in a library, or referenced by a common directory entry, or through some other means), so that they can be identified as a cooperative package for recovery of the system, applications, and point in time that were initially selected in act 310. These data can be stored, for example, on tape drive 192 or backup storage 194 from FIG. 1.

Figure 4:
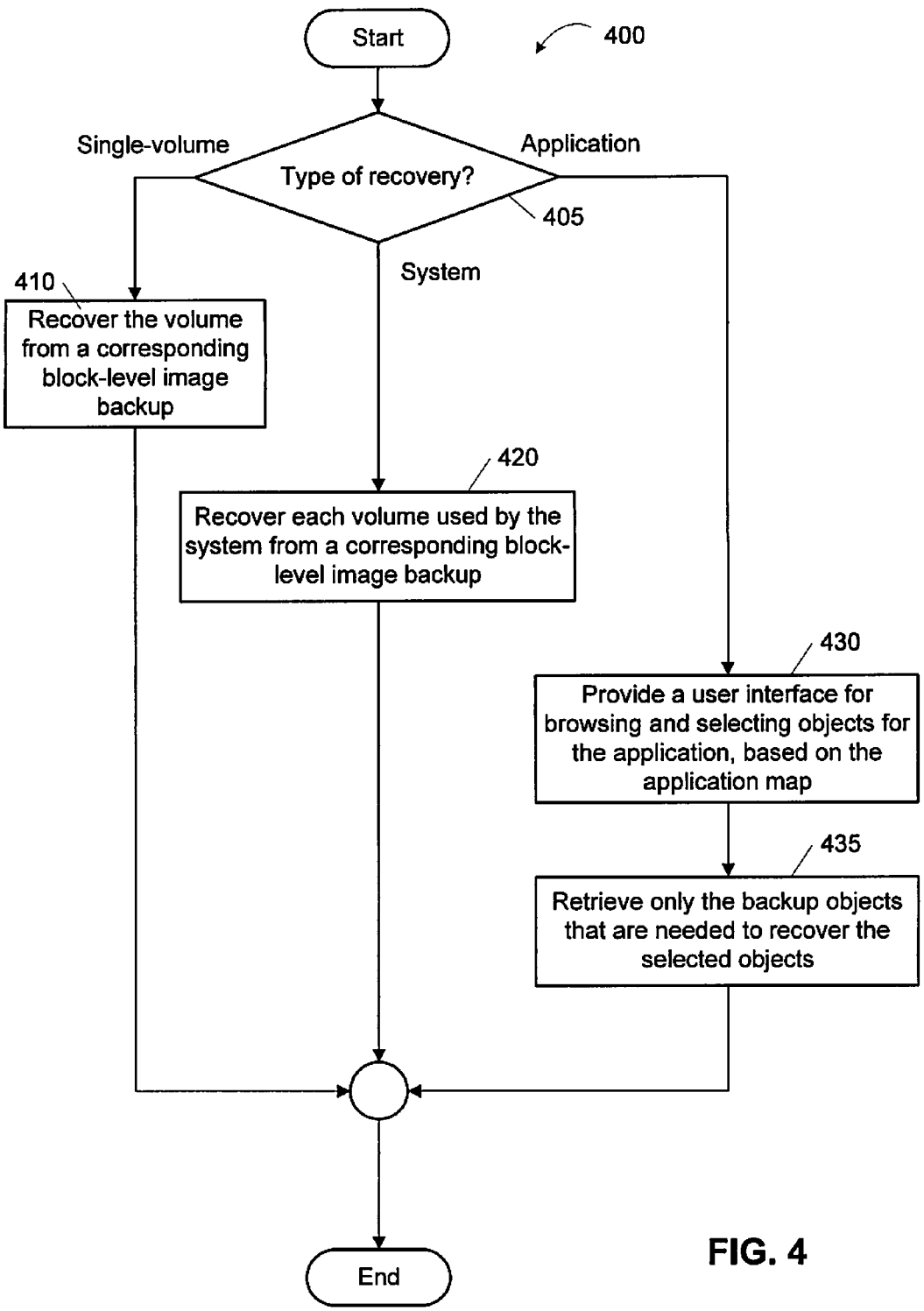
FIG. 4 is a flow chart of an example of a method to perform a recovery of a system to a prior point in time.

FIG. 4 is a flow chart of an example of a method 400 to perform a recovery of a system to a prior point in time. In act 405, the method determines whether the recovery is a recovery of a single volume, a recovery of an entire system, or a recovery of a particular application.

If the recovery is a recovery of a single volume, then control proceeds from act 405 to act 410. Act 410 uses a volume map (or other data location-to-image mapping information) to identify backup objects that hold an image backup of the single volume from the prior point in time. Act 410 then recovers the single volume by copying it from the image backup of the volume.

If the recovery is a recovery of an entire system, control proceeds from act 405 to act 420. Act 420 uses an application map (or other application-to-object mapping information), an object map (or other object-to-data location mapping information), and a volume map (or other data location-to-image mapping information) to identify backup objects that hold image backups of each volume used by the system at the prior point in time. Act 420 then recovers these volumes by copying them from the image backups of the volumes.

If the recovery is a recovery of a particular application (or file system), control proceeds from act 405 to act 430. Act 430 provides an interactive user interface through which a user can browse through an application map (or other application-to-object mapping information) for the application at the prior point in time. For example, the application map can use the information gathered in act 320 from FIG. 3, or database application map 174, or email application map 175 or file systems 123 or 133 from FIGS. 1 and 2. The application map indicates the files and other logical objects used by the application at the prior point in time. The application map also allows the user to view a description of where each of the logical objects were located with respect to the system that was running the particular application. The user can select, using the user interface, the individual objects to be retrieved. Alternatively, the user can select (or default) that all of the logical objects used by the particular application should be recovered.

Control proceeds from act 430 to act 435, which uses the object map (or other object-to-data location mapping information) and volume map (or other data location-to-image mapping information) for the prior point in time. For example, act 435 can use the information gathered in acts 340 and 360 from FIG. 3, or object maps 215 and volume map 179 from FIG. 2.

Act 435 identifies backup objects that hold data needed to reconstruct the selected logical objects from act 430. Act 435 then retrieves these backup objects and regenerates the selected logical objects from the retrieved backup objects. (Alternatively, act 435 can identify and retrieve all backup objects that hold data from each volume that stores the selected logical objects. Act 435 can mount full copies of these volumes from the image backups.) Method 400 then terminates.

Figure 5:
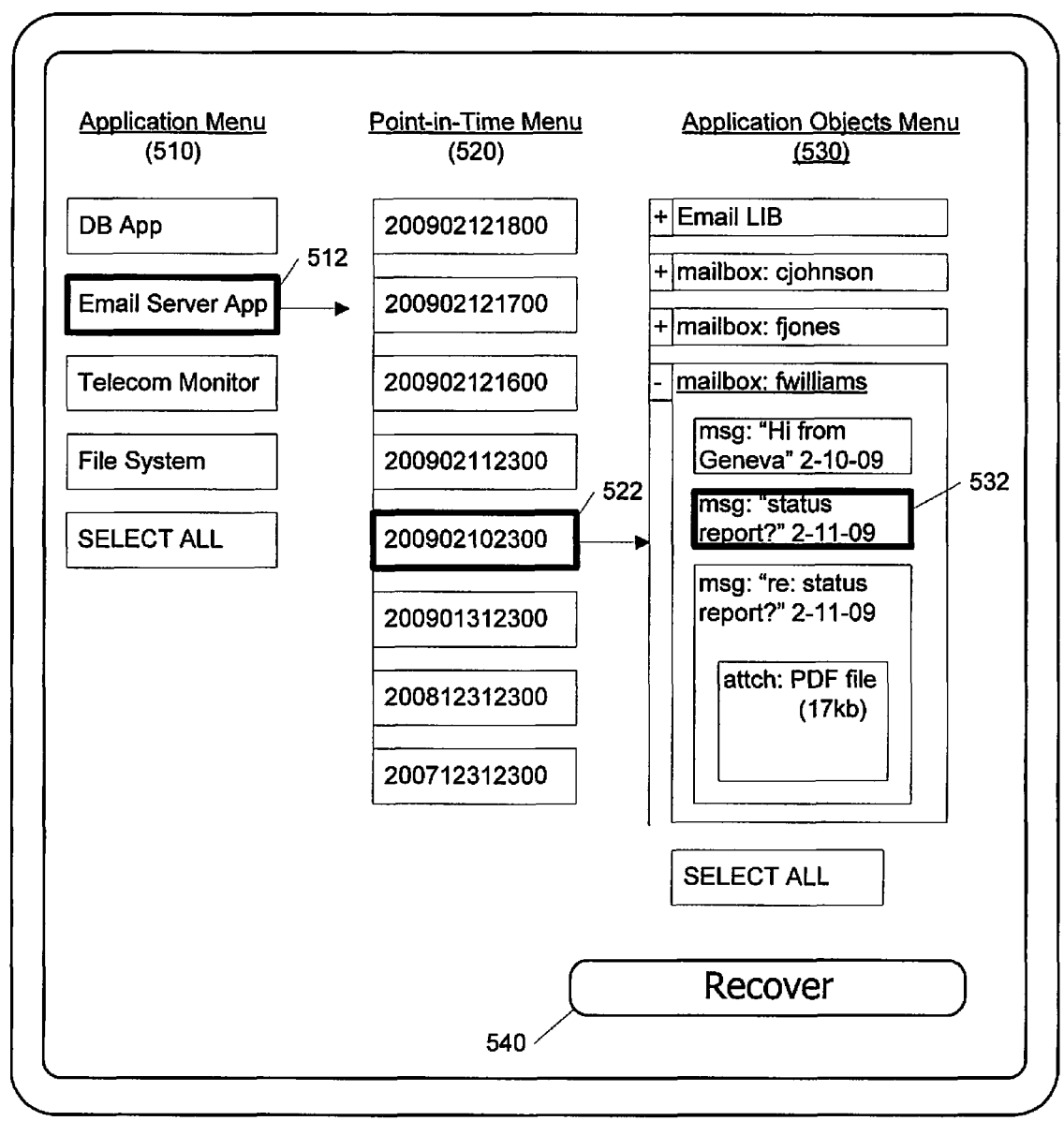
FIG. 5 shows an example view of a browser that provides a user interface for viewing locations of files and other logical objects that were stored in previous backup sessions.

FIG. 5 shows an example view of a browser 500 that provides a user interface for viewing locations of files and other logical objects that were stored in previous backup sessions. The browser can use, for example, the information gathered in act 320 from FIG. 3, or information from application maps 210 from FIG. 2, among others. Browser 500 can be implemented, for example, as a component within recovery utility 157.

Browser 500 provides an application menu 510, a point-in-time menu 520, an application objects menu 530, and a recovery selection input 540. Application menu 510 lists applications that are running or which were previously running on one or more systems. A user can select one or more of the applications to obtain further relevant information. Additionally, application menu 510 provides an option to select all of the listed applications. In the illustrated example, a user has made a selection 512 of an email server application from application menu 510.

As a result of selection 512, browser 500 has populated point-in-time menu 520 with several selectable options. Each of these selectable options refers to a prior point in time for which recovery information is available regarding the selected application 512. A user can select one the prior points in time to obtain further relevant information. In the illustrated example, a user has made a selection 522 of a particular point in time (denoted as "200902102300") from point-in-time menu 520.

As a result of selection 522, browser 500 has populated application objects menu 530 with several selectable options. Each of these selectable options refers to a logical object that was used by the selected application (512) at the selected prior point in time (522). A user can select one or more of the logical object in application objects menu 530 to hierarchically browse through sub-objects, if any, or otherwise obtain further relevant information (such as a preview of the object contents). Additionally, application objects menu 530 provides an option to select all of the listed logical objects. In the illustrated example, a user has made a selection 532 of a particular email message (dated "Feb. 11, 2009," and with a subject of "status report?") from application objects menu 530.

The information used to populate menus 510, 520, and 530 can be obtained, for example, from a collection of application maps (such as application maps 210 from FIG. 2) for various point-in-time backups. These menus may be scrollable or otherwise expandable to accommodate the necessary information. In this illustrated example, menu 510 lists all applications that could be recovered for at least one of the points in time. Menu 520 lists all the points in time for which an application map is available for the selected application. Menu 530 depicts the listed objects in an application map for the selected application and point in time. The structure of menu 530 can depend on the type of application being recovered. For example, menu 530 may depict an expandable hierarchy as shown (using, for example, user-selectable expansion ("+") and contraction ("−") symbols). In the illustrated example of menu 530, a user can explore a hierarchy of objects such as email mailboxes, email messages, and attachments as shown. Other versions of an email menu 530 may avoid a hierarchical structure. In situations where the selected application from menu 520 is a database, the resulting application objects menu 530 may or may not be hierarchical, and may display appropriate component objects for one or more databases. Similarly, in situations where the selected application from menu 520 is a file system, the resulting application objects menu 530 may display a set of volumes and a volume/file path hierarchy.

In the illustrated example, recovery selection input 540 is a button in a graphical user interface that initiates recovery of the selected object(s). In this example, the user may proceed to recover the selected email message 532 by clicking the button 540. This action would, for example, open a subsequent dialog box (not shown) that would ask where the user would like to save a recovered copy of message 532. Upon receiving this information, browser 500 would initiate a search for the backup objects (e.g., among backup objects 161, 162, 171, 172, and 173) that are needed to recover the selected object(s). This search can proceed by performing look-up queries in (or otherwise examining) appropriate object-to-data location mapping information (e.g., object maps 215) and data location-to-image mapping information (e.g., volume map 192) to identify the needed backup objects.

Figure 6:
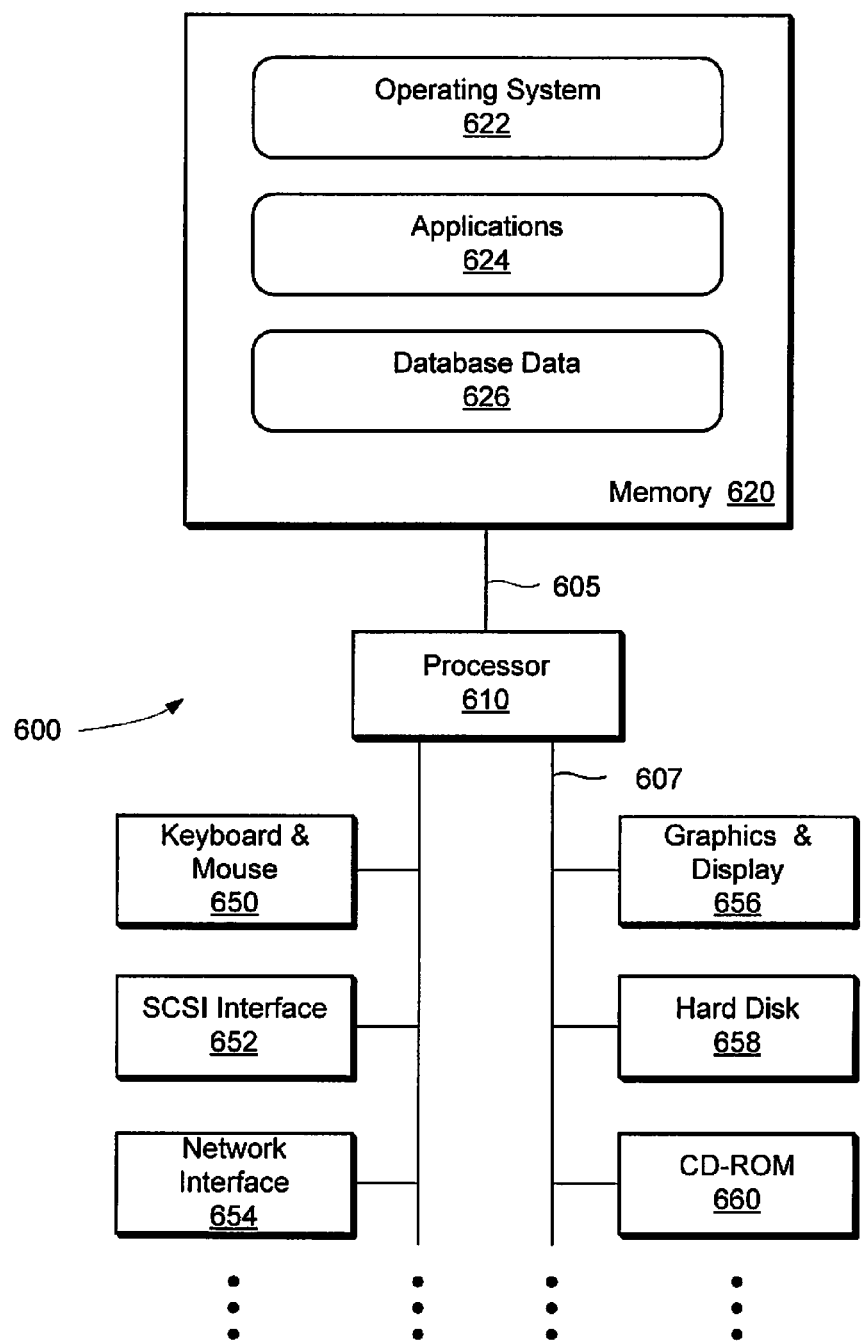
FIG. 6 is a block diagram of one implementation of a computer system that can be used for one or more of the techniques described herein.

FIG. 6 is a block diagram of one implementation of a computer system 600 that can be used for one or more of the techniques described herein. For example, the computer system 600, or portions thereof, can be used to implement a system (e.g., system 110) that runs applications to be backed up (or which uses volumes to be backed up, or which is itself to be backed up) by preserving copies of the data used by the applications in a manner that is consistent for a particular point in time. Computer system 600 can also be used to implement a backup server or a data mover (e.g., data mover 150), or can be used to run or simulate one or more virtual machines or to mount one or more virtual volumes. Computer system 600 can include one or more processors 610 and memories 620 coupled together by a communications bus 605. Processor 610 can be a single processor or a number of individual processors working together. It is also contemplated that processor 610 can be one or more virtual processors usable with interpreted languages. Memory 620 can be a random access memory (RAM) or some other dynamic storage device and can be capable of storing instructions to be executed by the processor, e.g., an operating system 622 and applications 624, as well as database data 626. Operating system 622 can include software for implementing a file system, managing network communications, managing user preferences, or combinations thereof, among others. Applications 624 can include backup and recovery software (such as utilities 155 and 157) for systems, volumes, files or other objects, user interface software (such as software to implement browser 500), database applications, email servers, data-mover applications, virtual-machine mounting software, volume management software, cellular communications applications, personal organizer applications, computational applications, accounting software, email clients, archiving software, interfaces to archiving software, API modules, volume replicators, encryption software, hashing software, snapshot creation and management software, CDP software, or combinations thereof, among others. Memory 620 can be augmented to include auxiliary storage such as a Single Inline Memory Module (SIMM) card, a flash memory, and/or a hard disk, and can also be used for storing temporary variables or other intermediate information during the execution of instructions by the processor 610.

Computer system 600 can also include devices such as a keyboard and mouse 650, other human-interface input devices, a SCSI interface 652, one or more network interfaces 654 supporting wired and/or wireless communications, a graphics module and display 656, other human-interface output devices, a hard disk 658, and a CD-ROM 660, all of which are coupled to processor 610 by a communications bus 607. It will be apparent to those having ordinary skill in the art that computer system 600 can also include numerous elements not shown in the figure, such as additional storage devices, communications devices, input devices and output devices, as illustrated by the ellipses shown.

FIGS. 1-5 illustrate some of the many operational examples of the techniques of the present invention. Those having ordinary skill in the art will readily recognize that certain steps or operations described herein can be eliminated or taken in an alternate order. Moreover, various operations discussed with respect to FIGS. 1-5 can be implemented as one or more software programs for a computer system and encoded in a computer readable medium. For example, software 622 or 624 can be stored as source code (e.g., in languages such as assembly language, Pascal, and C; object oriented languages such as C++, C#, and Java; and scripting languages such as Perl and Tcl/Tk) or compiled instructions executable on one or more processors. The computer readable medium can include a solid-state storage medium, a magnetic storage medium (e.g., hard disk 658), or an optical storage medium (e.g., CD-ROM 660), or combinations thereof. Separate instances of these programs may be executed on separate computer systems. Thus, although certain steps have been described as being performed by certain devices, software programs, processes, or entities, this need not be the case and a variety of alternative implementations will be understood by those having ordinary skill in the art. Additionally, those having ordinary skill in the art will readily recognize that the techniques described above can be utilized with a variety of different storage devices and computing systems with variations in, for example, the number of processors, host systems, storage systems, or applications, among others.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
generating and storing a set of backup objects, wherein
the backup objects comprise contents of a plurality of storage volumes from a point in time, and
each storage volume comprises a plurality of blocks in which data can be stored;
obtaining a first mapping information associated with a set of one or more applications, wherein
the first mapping information identifies, for each application in the set of applications, objects used by the application at the point in time;
obtaining a second mapping information for a plurality of objects identified in the first mapping information, wherein
the second mapping information identifies, for each object in the plurality of objects, block addresses in which the object was stored on the storage volumes at the point in time;
generating a third mapping information for a plurality of block addresses identified in the second mapping information, wherein
for each block address in the plurality of block addresses, the third mapping information identifies backup objects, among the set of backup objects, in which contents of the block address were stored for the point in time; and
transforming a backup repository by storing the first, second, and third mapping information in the backup repository, wherein
the first, second, and third mapping information are stored in association with each other and are configured to be used as a cooperative package to perform a recovery operation.

2. The method of claim 1, wherein for a first application among the set of applications:
the first mapping information comprises file paths of objects used by the first application.

3. The method of claim 2, wherein for a first file identified by the file paths:
the second mapping information identifies a first set of block addresses, wherein
the first set of block addresses correspond to a first set of blocks in a first storage volume among the plurality of storage volumes, and
the first set of blocks stored the first file at the point in time.

4. The method of claim 3, wherein for the first set of block addresses:
the third mapping information identifies a first set of block-level images that comprise copies of the first set of blocks from the point in time.

5. The method of claim 1, wherein the set of applications is executed on a first server, and the obtaining the first mapping information comprises:
generating a snapshot of a first volume in the set of volumes for the point in time, wherein generating the snapshot comprises:
quiescing access by the set of applications to the first volume; and
interrogating the first server to determine which objects on the first volume are related to the quiesced access.

6. The method of claim 1, wherein the set of applications is executed on a first server, and the obtaining the second mapping information comprises:
examining the volumes to identify block addresses that store each of the objects identified by the first mapping.

7. The method of claim 1, wherein:
the generating and storing the backup objects comprises storing the backup objects on a backup repository, wherein the backup repository is separate from the plurality of storage volumes; and
the third mapping information is based at least in part on backup records that reference the set of backup objects.

8. The method of claim 1, further comprising:
receiving a request for restoration relating to the point in time, and relating to a first application in the set of applications;
accessing the first mapping information;
using an appropriately configured machine for identifying a first set of one or more objects used by the first application at the point in time, based at least in part on the first mapping information;
accessing the second mapping information;
identifying a first set of block addresses in which the first set of objects was stored at the point in time, based at least in part on the second mapping information;
accessing the third mapping information;
identifying a first set of backup objects in which contents of the first set of block addresses were stored for the point in time, based at least in part on the third mapping information;
retrieving the first set of backup objects; and
reconstructing the first set of objects from data stored in the first set of backup objects.

9. The method of claim 8, wherein:
the request for restoration comprises a request to recover the first set of objects, and
the retrieving the first set of backup objects consists of retrieving only the first set of backup objects.

10. The method of claim 8, wherein:
the request for restoration comprises a request to recover the first application to the point in time; and
the retrieving the first set of backup objects consists of retrieving only backup objects that comprise data from objects used by the first application at the point in time.

11. The method of claim 1, comprising:
generating an interactive user interface for use in restoration of at least one of the applications; and
presenting, in the user interface, data from the first mapping information.

12. The method of claim 11, comprising:
receiving a request through the user interface, wherein the request specifies a set of one or more requested objects that were used at the point in time by a first application;
accessing the second mapping information;
identifying a first set of block addresses in which the requested objects were stored at the point in time, based at least in part on the second mapping information;
accessing the third mapping information;
identifying a first set of backup objects in which contents of the first set of block addresses were stored for the point in time;
retrieving the first set of backup objects;
reconstructing the requested objects from data stored in the first set of backup objects.

13. A system comprising:
one or more processors; and
an interface to a backup repository; wherein
  the one or more processors are configured to generate a set of backup objects and to store the set of backup objects in the backup repository, wherein
    the backup objects comprise contents of a plurality of storage volumes from a point in time, and
    each storage volume comprises a plurality of blocks in which data can be stored;
  the one or more processors are configured to obtain a first mapping information associated with a set of one or more applications, wherein
    for each application in the set of applications, the first mapping information identifies objects used by the application at the point in time;
  the one or more processors are configured to obtain a second mapping information for a plurality of objects identified in the first mapping information, wherein
    for each object in the plurality of objects, the second mapping information identifies block addresses in which the object was stored on the storage volumes at the point in time;
  the one or more processors are configured to generate a third mapping information for a plurality of block addresses identified in the second mapping information, wherein
    for each block address in the plurality of block addresses, the third mapping information identifies backup objects, among the set of backup objects, in which contents of the block address were stored for the point in time; and
  the one or more processors are configured to transform the backup repository by storing the first, second, and third mapping information in the backup repository, wherein
    the first, second, and third mapping information are stored in association with each other and are configured to be used as a cooperative package to perform a recovery operation.

14. The system of claim 13, wherein for a first application among the set of applications:
  the first mapping information comprises file paths of objects used by the first application.

15. The system of claim 14, wherein for a first file identified by the file paths:
  the second mapping information identifies a first set of block addresses, wherein
    the first set of block addresses correspond to a first set of blocks in a first storage volume among the plurality of storage volumes, and
    the first set of blocks stored the first file at the point in time.

16. The system of claim 15, wherein for the first set of block addresses:
  the third mapping information identifies a first set of block-level images that comprise copies of the first set of blocks from the point in time.

17. The system of claim 13, wherein the set of applications is executed on a first server, and the one or more processors are configured to:
  quiesce access by the set of applications to the first volume while;
  generate a snapshot of a first volume in the set of volumes for the point in time while the access is quiesced;
  interrogate the first server to determine which objects on the first volume are related to the quiesced access; and
  examine the volumes to identify block addresses that store each of the objects identified by the first mapping.

18. The system of claim 13, wherein the one or more processors are configured to:
  receive a request for restoration relating to the point in time, and relating to a first application in the set of applications;
  access the first mapping information;
  identify a first set of one or more objects used by the first application at the point in time, based at least in part on the first mapping information;
  access the second mapping information;
  identify a first set of block addresses in which the first set of objects was stored at the point in time, based at least in part on the second mapping information; access the third mapping information;
  identify a first set of backup objects in which contents of the first set of block addresses were stored for the point in time, based at least in part on the third mapping information;
  retrieve the first set of backup objects; and
  reconstruct the first set of objects from data stored in the first set of backup objects.

19. The system of claim 13, further comprising:
a computer system, wherein
  the computer system is configured to execute an interactive user interface for restoration of at least one of the applications; and
  the user interface is configured to display data from the first mapping information.

20. A computer program product comprising:
a computer-readable storage medium; and
machine-readable instructions encoded on the computer-readable storage medium, wherein the machine-readable instructions are executable by one or more processors to perform a method comprising:
  generating and storing a set of backup objects, wherein
    the backup objects comprise contents of a plurality of storage volumes from a point in time, and
    each storage volume comprises a plurality of blocks in which data can be stored;
  obtaining a first mapping information associated with a set of one or more applications, wherein
    for each application in the set of applications, the first mapping information identifies objects used by the application at the point in time;
  obtaining a second mapping information for a plurality of objects identified in the first mapping information, wherein
    for each object in the plurality of objects, the second mapping information identifies block addresses in which the object was stored on the storage volumes at the point in time;
  generating a third mapping information for a plurality of block addresses identified in the second mapping information, wherein
    for each block address in the plurality of block addresses, the third mapping information identifies backup objects, among the set of backup objects, in which contents of the block address were stored for the point in time; and
  transforming a backup repository by storing the first, second, and third mapping information in the backup repository, wherein
    the first, second, and third mapping information are stored in association with each other and are configured to be used as a cooperative package to perform a recovery operation.

* * * * *